United States Patent [19]
Nishimoto et al.

[11] Patent Number: 5,336,549
[45] Date of Patent: Aug. 9, 1994

[54] BIAXIALLY ORIENTED LAMINATED FILM

[75] Inventors: Yoshiharu Nishimoto; Kengo Yamazaki; Takashi Sato, all of Iwaki, Japan; Eiichi Hayashi, Gorssel, Netherlands; Hajime Tukamoto, Niihara, Japan

[73] Assignee: Kureha Kagaku Kogyo Kabushiki Kaisha, Tokyo, Japan

[21] Appl. No.: 744,577

[22] Filed: Aug. 13, 1991

[30] Foreign Application Priority Data

Aug. 20, 1990 [JP] Japan ................................ 2-218602

[51] Int. Cl.$^5$ ..................... B32B 7/02; B32B 27/32; B32B 27/34; B32B 27/36
[52] U.S. Cl. ............................ 428/213; 428/216; 428/220; 428/336; 428/347; 428/475.2; 428/475.8; 428/476.1; 428/476.9; 428/480; 428/910
[58] Field of Search ............ 428/480, 483, 910, 475.2, 428/476.9, 35.4, 213, 216, 219, 220, 334, 336, 347, 475.8, 476.1

[56] References Cited

U.S. PATENT DOCUMENTS

| | | | |
|---|---|---|---|
| 4,654,240 | 3/1987 | Johnston | 428/35 |
| 4,732,795 | 3/1988 | Ohya et al. | 428/36 |
| 4,851,245 | 7/1989 | Hisazumi et al. | 426/105 |
| 4,883,693 | 11/1989 | Ohya et al. | 428/34.9 |
| 4,911,979 | 3/1990 | Nishimoto et al. | 428/332 |
| 4,963,426 | 10/1990 | Nishimoto | 428/213 |
| 4,977,022 | 12/1990 | Mueller | 428/349 |
| 5,053,259 | 10/1991 | Vicik | 428/36.91 |
| 5,068,136 | 11/1991 | Yoshida et al. | 428/35.7 |

FOREIGN PATENT DOCUMENTS

| | | |
|---|---|---|
| 1636055 | 2/1971 | Fed. Rep. of Germany . |
| 2067131 | 7/1981 | United Kingdom . |

*Primary Examiner*—D. S. Nakarani
*Attorney, Agent, or Firm*—Nixon & Vanderhye

[57] ABSTRACT

Disclosed herein is a biaxially oriented laminated film comprising at least a surface layer of a polyester containing not less than 88 mol. % of terephthalic acid as an acid ingredient, an intermediate layer of a polyamide having a melting point of higher than 160° C. and lower than 210° C. and a heat-sealing layer or a polyolefin, the thickness of the polyester layer being lower than the thickness of the polyamide layer.

7 Claims, No Drawings

BIAXIALLY ORIENTED LAMINATED FILM

BACKGROUND OF THE INVENTION

The present invention relates to a biaxially oriented laminated film which is composed of a surface layer of a polyester, an intermediate layer of a polyamide and a heat-sealing layer of a polyolefin and which has excellent stretching processability, heat-sealing property and packaging property, and shows a good transparency after heat sterilization.

Polyesters are generally excellent in heat resistance and packaging property, but they have a low impact strength. To improve the impact strength, polyesters are subjected to a stretching processing. Since ordinary polyesters have a high crystallinity, it is necessary to orient them with great force, which requires a large-sized stretching machine. A polyamide is laminated on a polyester in order to further improve the mechanical strength. Since the crystallizing rate of polyamides is also nigh, it is difficult to subject the polyamides to an ordinary stretching processing. In this way, a laminated film consisting of only these two resins is not easy to stretch, and the productivity of such a stretched film is poor at present. A film produced from these resins must be stretched with great force and naturally requires after-treatments such as heat setting and heat treatment which may be the cause of the lowering of the interlaminar strength.

Heat sealing is generally adopted as a sealing method in automatic packaging. Even if the above-described laminated film is managed to be stretched, since the film is oriented, it is difficult to heat-seal. As a countermeasure, polyolefins are used as a heat-sealing layer. In this case, since the respective resin layers have different degrees of orientation from each other, an adhesive layer is inserted therebetween, but it is still impossible to obtain a high interlaminar strength and, hence, a sufficient sealing strength. Especially, in the case of operating a packaging machine at a high speed, the sealing strength of the film is apt to be influenced by the difference in the degree of orientation. If the polyolefins are used as a surface layer, the polyolefins are apt to adhere to the sealing bar and makes automatic packaging at a high speed difficult.

If the mutual balance of the degree of orientation of the polyester, polyamide and polyolefin is lost due to stretching, the laminated film shrinks during the bag-making, so that it is difficult to bundle the bags and the transparency of the films after heat sterilization is greatly lowered.

With respect to polyester films, Japanese Patent Application Laid-Open (KOKAI) No. 58-175658 (1983) discloses a biaxially oriented film produced by laminating a polyamide copolymer film as a heat-sealing layer, having a melting point of not higher than 150° C. at least one side of a polyethylene terephthalate film and substantially heat-treating the laminated film.

Japanese Patent Application Laid-Open (KOKAI) No. 60-232948 (1985) discloses a polyester laminated film which is composed of a polyethylene terephthalate layer and a copolyester layer modified by isophthalic acid, and which is heat-treated after the film formation and the stretching processes.

Japanese Patent Publication No. 55-3137 (1980) discloses a composite film produced by laminating a polyethylene terephthalate film (A) and a polymer film (B) which has a stretching temperature in the range of 70° to 120° C. and which is other than (A), through an adhesive layer containing one selected from the group consisting of an urethane-modified polyester, polyalkylene imine, a alkylated titanium and a self-crosslinking acrylic resin as the main ingredient, and uniaxially or biaxially orientating the laminate.

These biaxially oriented laminated films, however, cannot be said to have sufficiently solved the problems such as stretching processability, heat-sealing property and transparency.

As a result of studies undertaken by the present inventors to solve the above-described problems of a stretched polyester film, it has been found that by laminating on a specific polyester layer as a surface layer, a specific polyamide layer as an intermediate layer and a polyolefin layer as a heat-seal layer so that the thickness of the polyester resin layer is lower than that of the polyamide layer, the thus obtained biaxially oriented film has excellent stretching processability, heat-sealing property and packaging property, and shows a good transparency after heat sterilization. On the basis of this finding, the present invention has been achieved.

SUMMARY OF THE INVENTION

In an aspect of the present invention there is provided a biaxially oriented laminated film comprising at least a surface layer of a polyester containing not less than 88 mol. % of terephthalic acid as an acid ingredient, an intermediate layer of a polyamide having a melting point of higher than 160° C. and lower than 210° C., and a heat-sealing layer of a polyolefin, wherein the thickness of the polyester resin layer is lower than the thickness of the polyamide layer.

DETAILED DESCRIPTION OF THE INVENTION

The polyester in the present invention is selected on the basis of the stretching processability and the packaging property, and contains as an acid ingredient not less than 88 mol. % of terephthalic acid. A polyethylene terephthalate produced by polycondensing aromatic carboxylic acid containing not less than 88 mol. % of terephthalic acid and a dialcohol containing ethylene glycol as the main ingredient is preferred, and a copolyester of ethylene terephthalate is more preferred. The terephthalic acid content in the acid ingredient is not less than 88 mol. %, preferably 88 to 98 mol. %.

If the terephthalic acid content is less than 88 mol. %, the polyester produces a bridge in the hopper of an extruding machine, thereby makes extrusion unstable. In addition, in the case of using a packaging machine, the surface layer of a polyester adheres to the sealing bar, thereby making automatic packaging at a high speed difficult.

In an ethylene terephthalate copolymer, the typical dicarboxylic acid other than terephthalic acid is isophthalic acid, and the typical dialcohols other than ethylene glycol are diethylene glycol and cyclohexane dimethanol. A mixture with another resin may be used as the polyesters so long as not less than 50% of the said polyesters is contained therein, and various known additives may be contained, if necessary.

The polyamide is selected on the basis of the stretching processability and has the melting point of lower than 210° C., because of the high crystallizing rate of the polyamide, it is difficult to subject the polyamide to an ordinary stretching processing. In order to facilitate the stretching of a laminate of the polyamide and the polyester, an aliphatic polyamide having a melting point of more than 160° C. and lower than 210° C. is preferably used.

An example of such a polyamide is one which is selected from the group consisting of a polymer, a copolymer and a terpolymer of nylon 6, nylon 66, nylon 69, nylon 9, nylon 11, nylon 12, nylon 610, nylon 612, nylon 6-66, nylon 6-69, nylon 6-12 or nylon 6-66-610, and which has a melting point of lower than 210° C., preferably more than 160° C. and lower than 210° C. A particularly preferred polyamide is a copolymer containing nylon 6 as the main ingredient, wherein the nylon 6 content is not more than 80 wt. % and the melting point of the polyamide is more than 160° C. and lower than 210° C. The polyamide may be a mixture with an aliphatic polyamide. If one component of the polyamide mixture is an aromatic polyamide, the content thereof is preferably not more than 40 wt. %.

The polyolefin layer is used as the heat-sealing layer, which is the innermost layer and which imparts a heat-sealing property. The polyolefin is selected from resins which are easily heat-sealed, and an α-olefin resin having a melting point of 110° to 150° C. is preferable. Examples of such an α-olefin resin are α-olefin polymers and copolymers containing at least one selected from the group consisting of ethylene, propylene and butene-1, and copolymers of ethylene, propylene or butene-1 and another α-olefin. As examples of another α-olefin may be exemplified α-olefins having 3 to 18 carbon atoms such as pentene-1, 4-methyl pentene-1, hexene-1 and octene-1. Especially, a copolymer of ethylene and another α-olefin is preferable due to the excellent cold resistance during the transportation in a cold state and the excellent sealing strength during heat sterilization.

It is necessary that the thickness of the polyester layer as the surface layer is lower than the thickness of the polyamide layer from the point of view of the stretching processability. However, in order to prevent the polyester layer from adhering to the sealing bar, the thickness thereof is preferably at least 1 $\mu$m. If it is less than 1 $\mu$m, it is sometimes difficult to produce a uniform film of the polyester. The thickness of the polyester layer is preferably 1 to 10 $\mu$m, more preferably 1 to 5 $\mu$m. If the thickness exceeds 10 $\mu$m, the stretching processability becomes to be deteriorated. The thickness of the polyamide layer is preferably not more than 40 $\mu$m.

It is desired that the ratio of (the thickness of the polyamide layer)/(the thickness of the polyester layer) exceeds 1. The ratio is preferably not more than 15, more preferably not more than 8. It is preferable that the ratio of (the thickness of the polyolefin layer)/(the thickness of the polyamide layer + the thickness of the polyester layer) exceeds 1.

In order to facilitate heat sealing, it is preferable that the polyolefin layer is the thickest of all the layers and that it is not less than 15 $\mu$m. The thickness of the biaxially oriented laminated film of the present invention is preferably not more than 120 $\mu$m.

In the present invention, it is possible to laminate another layer on the laminated film composed of the polyester layer, the polyamide layer and the polyolefin layer, if necessary. For example, a gas barrier resin layer is provided in order to improve the oxygen gas barrier property.

As examples of the gas barrier resin will be exemplified a saponified ethylene-vinyl acetate copolymer, aromatic polyamide, xylylene-diamine polyamide and acrylonitrile resin. Known resins, oligomers and additives which do not impair the gas barrier property or the stretching processability, may be contained in the range which allows the above-described resins as the main ingredient. The thickness of the gas barrier resin layer is preferably not more than 11 $\mu$m, more preferably 4 to 8 $\mu$m from the point of view of stretching processability. When the biaxially oriented laminated film includes an oxygen gas barrier layer, the oxygen gas permeability is not more than 200 cc/m$^2$·day·atm (30° C., 100% RH), preferably not more than 150 cc/m$^2$·day·atm (30° C., 100% RH).

An adhesive resin is used, if necessary. In the case of co-extrusion, the adhesive resin is preferably disposed between the polyolefin and another resin. The adhesive resin may be disposed on the interface between layers. The adhesive resin is selected from the group consisting of known thermoplastic polymers, copolymers and terpolymers. These resins modified by unsaturated carboxylic acid, unsaturated carboxylic acid-modified resins which are modified by a metal, and mixtures containing these modified resins are preferable. The thickness of the adhesive layer is preferably 1 to 5 $\mu$m. If it is less than 1 $\mu$m, the adhesive strength is apt to become insufficient. On the other hand, if it exceeds 5 $\mu$m, the transparency of the film is sometimes lowered after the heat-shrinking processing.

The polyester, the polyamide and the polyolefin of the present invention are preferably laminated by a coextrusion method. Each of the resins is co-extruded in the form of a tube from a circular die equipped with the same number of extruders as the number of resins to be laminated. The laminate extruded from the die is immediately quenched to 5° to 20° C. in a cooling bath and formed into a flat cylindrical body. The cylindrical body is heated and stretched to 1.3 to 4.0 times, preferably 1.5 to 3.0 times both in the machine direction and in the transverse direction by inflation, thereby producing a biaxially oriented multi-layered film.

The heating temperature is not lower than 70° C. and lower than 100° C., preferably 80° to 95° C. If the heating temperature is lower than 70° C., the stretchability is lowered and a dimensional change is increased. If the heating temperature is higher than 100° C., it is impossible to obtain tile desired heat shrinkage percentage.

The heat shrinkage percentage of a biaxially oriented laminated film of the present invention is not less than 15%, preferably not less than 20% both in the machine direction and in the transverse direction when the film is immersed in hot water of 98° C. for 1 minute. If the heat shrinkage percentage is less than 15%, a wrinkle is produced on the surface of a packaged article or the conform adhesion between the contents and the packaging film is lowered, thereby deteriorating the external appearance of the article.

The laminated film may be irradiated with an electron beam before stretching, if necessary. Any of the method of irradiating the sealing layer (e.g., Japanese Patent Application Laid-Open (KOKAI) No. 47-34565 (1972)), the method of irradiating all the layers (e.g., Japanese Patent Application Laid-Open (KOKAI) No. 52-43889 (1977)), and the method of irradiating a part of the layers from the surface layer (e.g., Japanese Patent Publication No. 64-500180 (1989)) may be used.

The thus-obtained biaxially oriented laminated film according to the present invention is formed into pillows, bags, pouches, etc. by the known bag-forming technique. Since a specific polyester having a specific thickness is used in the present invention, the film does not adhere to the sealing bar during the bag forming processing, thereby facilitating bag forming.

The thus-obtained laminated film of the present invention is filled with contents, sealed and subjected to a heat-shrinking processing.

In the present invention, since the thickness of each of the polyester layer and the polyamide layer is regulated so as to facilitate the stretching of the film, the heat shrinkage is uniform in each layer. The transparency is therefore not lowered even after heat sterilization.

According to the present invention, by laminating a surface layer of a specific polyester, an intermediate layer of a specific polyamide and a polyolefin layer, and by regulating the thicknesses of the polyester layer and the polyamide layer, it is possible to obtain a biaxially oriented laminated film which is excellent in the stretching processability and heat-sealing property, which is free from a trouble caused by the adhesion of the film to the sealing bar in the case of using an automatic packaging machine, in other words, which has a good packaging property, and which has a good transparency after neat sterilization.

Since the thickness of the polyester layer is specified and it is laminated on the polyamide layer which is easy to stretch (melting point: more than 160° C. and lower than 210° C.), it is easy to stretch the film with a comparatively small force and a troublesome after-treatment such as heat setting and heat treatment is dispensed with.

In addition to the above-described advantages, the biaxially oriented laminated film includes a resin layer having an oxygen gas barrier property, the preservation period for the contents is prolonged.

EXAMPLES

The present invention will be explained in the following with reference to the following examples. It is to be understood, however, the present invention is not restricted to the following examples within the scope of the invention.

EXAMPLES 1 TO 4, COMPARATIVE EXAMPLES 1 TO 5

The resins listed in Table 1 were extruded respectively by a plurality of extruders in accordance with the layer structure shown in Table 3, and the molten polymers were introduced to a co-extrusion circular die. The molten polymers were fusion bonded in the order of the layers shown in Table 3 and co-extruded from the die so as to obtain a laminate having a predetermined number of layers. The laminate ejected from the die was quenched to 10° to 18° C., thereby producing a cylindrical body having a flat width of 180 mm and a thickness of 259 to 276 μm. The cylindrical body was then heated to 90° to 95° C. and stretched to 2.3 times in the machine direction and 2.5 times in the transverse direction by inflation. Thus, an oriented film having a diameter of 450 mm in a folded state and a thickness of 46 to 60 μm was obtained.

Table 1 shows the physical properties of the resins used, Table 2 shows the methods of measuring the physical properties of an oriented film and Table 3 shows the layer structure and the physical properties of an oriented film.

TABLE 1

| Kind of resin | Contents | Crystalline melting point (°C.) |
| --- | --- | --- |
| PET-1 | Polyethylene terephthalate | 252 |
| PET-2 | Ethylene terephthalate copolyester (isophthalic acid: 5 mol %, and terephthalic acid: 95 mol %) | 237 |
| PET-3 | Ethylene terephthalate copolyester (isophthalic acid: 20 mol %, and terephthalic acid: 80 mol %) | — |
| PA-1 | 6-66 nylon (copolymerization ratio: 80/20 wt %) | 195 |
| PA-2 | 6-12 nylon (copolymerization ratio: 50/50 wt %) | 135 |
| PA-3 | 66 nylon | 265 |
| PO-1 | Ethylene-butene-1 copolymer (density: 0.906) | 123 |
| PO-2 | Propylene-ethylene copolymer (copolymerization ratio: 93/7 wt %) | 135 |
| EVOH | Saponified ethylene-vinyl acetate copolymer (ethylene content: 42 mol %) | 164 |
| M-PE | Acid-modified ethylene-α-olefin copolymer | — |

TABLE 2

| Physical property | Measuring method |
| --- | --- |
| Transparency after shrinkage | A bag was filled with processed meat and packaged in vacuo. The packaged meat was heated in a hot water bath of 98° C. for 10 minutes. A change of the film was observed. |
| Heat shrinkage percentage | Five films cut to a length of 10 cm and a width of 10 cm were shrunk in a hot water bath of 98° C. for 1 minute in a relaxed state. Average value of the shrinkage percentages based on the original length and width were obtained. |
| Oxygen gas permeability | A film is allowed to stand in an atmosphere of 30° C. and 100% RH for 1 week before measurement. The oxygen gas permeability is measured in an atmosphere of 30° C. and 100% RH by using MOCON#OX-TRAN TWIN (coulometric detection method) which is the apparatus specified by ASTM: D 3985-81. |

TABLE 3

Layer structure and physical properties of film

| | First layer (μm) | Second layer (μm) | Third layer (μm) | Fourth layer (μm) | Fifth layer (μm) | Sixth layer (μm) | Stretching Processability | Heat-sealing property |
| --- | --- | --- | --- | --- | --- | --- | --- | --- |
| Example 1 | PO-1(27) | M-PE(3) | PA-1(17) | M-PE(3) | PET-2(4) | | ④ | ③ |
| Example 2 | PO-1(27) | M-PE(3) | EVOH(6) | PA-1(17) | M-PE(3) | PET-1(4) | ③ | ③ |
| Example 3 | PO-1(19) | M-PE(2) | EVOH(6) | PA-1(12) | M-PE(2) | PET-2(4) | ④ | ③ |
| Example 4 | PO-1(19) | M-PE(2) | EVOH(6) | PA-1/PA-2 = 7/3(12) | M-PE(2) | PET-2(4) | ④ | ③ |
| Comparative Example 1 | PO-1(19) | M-PE(2) | EVOH(6) | PA-1(12) | M-PE(2) | PET-3(4) | ② | ③ |
| Comparative | PO-1(27) | M-PE(3) | EVOH(6) | PA-2(17) | M-PE(3) | PET-1(4) | ② | ③ |

TABLE 3-continued

| | | | | | | | | |
|---|---|---|---|---|---|---|---|---|
| Example 2 | | | | | | | | |
| Comparative Example 3 | PO-1(27) | M-PE(3) | EVOH(6) | PA-1(6) | M-PE(3) | PET-1(8) | ① | — |
| Comparative Example 4 | PO-1(27) | M-PE(3) | EVOH(6) | PA-3(17) | M-PE(3) | PET-1(4) | ① | — |
| Comparative Example 5 | PO-1(27) | M-PE(3) | EVOH(6) | PA-2(17) | M-PE(3) | PO-2(4) | ④ | ② |

| | Packaging property | Transparency after shrinkage | Heat shrinkage percentage (%) | Oxygen gas permeability (cc/m² · day · atm) |
|---|---|---|---|---|
| Example 1 | ③ | ③ | 25/28 | 320 |
| Example 2 | ③ | ③ | 27/30 | 74 |
| Example 3 | ③ | ③ | 24/26 | 67 |
| Example 4 | ③ | ③ | 29/31 | 65 |
| Comparative Example 1 | ① | ② | 27/29 | 80 |
| Comparative Example 2 | ② | ② | 28/30 | 82 |
| Comparative Example 3 | — | — | — | — |
| Comparative Example 4 | — | — | — | — |
| Comparative Example 5 | ① | ① | 26/28 | 69 |

Evaluation Methods (1) Stretching Processability
④: The stretchability was stable.
③: Although the stretchability was not bad, the inflation initiating point varied and bubble break was sometimes caused.
②: The variation of the load of the extruder was great and the inflation initiating point also varied. Without heat-treatment, the film was shrunk by not less than 8% during storage at room temperature.
①: Could not be stretched.

(2) Heat-Sealing Property
③: Even when the packaged bags were sterilized in a hot water bath of 98° C. for 10 minutes, the bags were not broken from the heat-sealed portion.
②: When the packaged bags were sterilized in a hot water bath of 98° C. for 10 minutes, not more than 80% of the bags were broken from the heat-sealed portion.
①: When the packaged bags were sterilized in a hot water bath of 98° C. for 10 minutes, not less than 20% of the bags were broken from the heat-sealed portion.

(3) Packaging Property
③: The film did not adhere to the sealing bar and stable packaging and bag forming were enabled. Packaging at a film speed of 10 m/min was achieved by using a pillow type packaging machine.
②: Stable packaging and bag forming were impossible due to the variation in the film thickness or the unstable sealing strength.
①: Stable packaging and bag forming were impossible due to the adhesion of the film to the sealing bar or the shrinkage of the film.

(4) Transparency After Shrinkage
③: The contents were clearly visible through the film.
②: Although the contents were visible through the film, the film was slightly whitened.
①: The whitening of the film was remarkable.

It is desirable that a biaxially oriented laminated film which is practically used, has a stretching processability of not less than ③, a heat-sealing property of not less than ③, a packaging property of not less than ③ and a transparency after shrinkage of not less than ③.

As shown in Examples 1 to 4, a biaxially oriented laminated film of the present invention has excellent stretching processability, heat-sealing property, packaging property and transparency. In contrast, in Comparative Example 1, since the terephthatic acid of PET-3 was 80 mol. %, the film adhered to the sealing bar, the dimension stability was poor and a shrinkage of not less than 8% was caused. In Comparative Example 2, since the melting point of PA-2 was as low as 135° C., the variation in the load of the extruder was great and the stretchability was unstable. The variation in the dimensions of the film was also great. In addition, the film thickness was not uniform. In Comparative Example 3, since the thickness (8 μm) of PET-1 was larger than the thickness (6 μm) of PA-1, stretching of the film was impossible. In Comparative Example 4, since the melting point of PA-3 was as high as 265° C., stretching of the film was impossible. In Comparative Example 5, the packaging property was bad and the transparency after shrinkage was also bad. In this way, in none of these films obtained in Comparative Examples 1 to 4, the object of the present invention was achieved.

What is claimed is:

1. A biaxially oriented, coextruded laminated film having a heat shrinkable property in both machine and transverse directions, said film comprising at least a surface layer of a polyester containing not less than 88 mol. % of terephthalic acid as an acid ingredient, an intermediate layer of a polyamide having a melting point of greater than 160° C. and less than 210° C. and a heat sealing layer of a polyolefin, the thickness of said polyester layer being 1 to 10 μm and thinner than the thickness of said polyamide layer.

2. The biaxially oriented, coextruded, laminated film according to claim 1 further comprising an oxygen gas barrier layer which is positioned between the surface layer and the heat sealing layer.

3. The biaxially oriented, coextruded, laminated film according to claim 1, wherein said polyolefin is an α-polyolefin having a melting point of 110° to 150° C.

4. The biaxially oriented, coextruded, laminated film according to claim 1, wherein the thickness of said polyolefin heat sealing layer is at last 15 μm, and the thickness of said laminated film is not more than 120 μm.

5. The biaxially oriented, coextruded, laminated film according to claim 1, wherein the ratio of (the thickness of said polyamide layer)/(the thickness of said polyester layer) is more than 1 and not greater than 15.

6. The biaxially oriented, coextruded, laminated film according to claim 1, wherein the ratio of (the thickness of said polyolefin layer)/(the thickness of said polyamide layer + the thickness of said polyester layer) exceeds 1.

7. The biaxially oriented, coextruded, laminated film according to claim 1, wherein said film has a heat shrinkage rate of at least 15% in both the machine direction and the transverse direction at 98° C.

* * * * *